Patented Nov. 24, 1953

2,660,603

UNITED STATES PATENT OFFICE 2,660,603

PREPARATION OF TETRAALKYLPYROPHOSPHITES

Richard W. Young and Jack Blodinger, Stamford, and Alice D. Welcher, Old Greenwich, Conn., assignors to American Cyanamid Company, New York, N. Y., a corporation of Maine No Drawing. Application June 12, 1951, Serial No. 231,264

7 Claims. (Cl. 260—461)

This invention relates to a new method for preparing organophosphorus compounds and more particularly a method of preparing tetraalkylpyrophosphites.

The tetraalkylpyrophosphites comprise a known group of compounds which have utility in organic syntheses and in biological chemistry. Heretofore these compounds have been prepared by reacting a dialkylhalophosphite with an alkali metal salt of a dialkylphosphite. This procedure however has several disadvantages. In the first place, the alkali metal stalts of dialkylphosphites are very hygroscopic compounds and as the above procedure requires anhydrous conditions this causes considerable difficulty. It might also be mentioned that these salts are not conveniently prepared as it is usually necessary to employ the free alkali metal in their preparation. A second disadvantage of the above procedure is that very low yields are obtained. The procedure has a third disadvantage in that an alkali metal salt such as sodium chloride is formed as a by-product of the reaction, and as the reaction is usually performed in anhydrous solvents, the removal of this insoluble salt is frequently very difficult.

The new process of this invention overcomes the above difficulties and results in the production of the tetraalkylpyrophosphites in exceptionally good yields. According to the procedure of this invention a dialkylhalophosphite is reacted with a dialkylphosphite in the presence of a tertiary amine base under anhydrous conditions. This procedure completely eliminates the necessity for the formation of the above mentioned highly hygroscopic alkali metal salt of a dialkylphosphite and results in a reaction mixture free of alkali metal halide salts from which it is comparatively simple to isolate the desired tetraalkylpyrophosphite in relatively pure form.

The process of this invention can be more clearly illustrated by means of the following general equation:

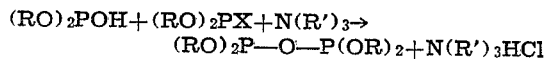

in which R represents a lower alkyl radical having between two and four carbon atoms, R' is a hydrocarbon radical capable of being attached to an amine group, and X is halogen, for instance chlorine or bromine.

As will be seen from the above equation, the tertiary amine serves as a halogen acid acceptor, and does not otherwise enter into the reaction. It will, therefore, be obvious to those skilled in the art that practically any basic tertiary amine may be satisfactorily employed. Illustrative examples of suitable amines are trimethylamine, triethylamine, tributylamine and diethylaniline. For reasons of convenience and economy, triethylamine is usually preferred.

The new reaction of this invention may be conveniently performed in an anhydrous organic solvent and preferably a hydrocarbon solvent such as benzene, toluene or pentane. Ether may be used but anhydrous ether has the disadvantage that it readily absorbs moisture and is therefore inferior to the aromatic hydrocarbon solvents. Chlorinated hydrocarbons such as chloroform and chlorobenzene are quite satisfactory and the lower aliphatic esters for instance ethyl acetate, and cyclic ethers for instance dioxane, may also be employed with reasonably satisfactory results. One can also satisfactorily employ an excess of the dialkylphosphite reactant as a solvent or, if desired, the reaction may be performed in the absence of a solvent.

The tetraalkylpyrophosphites react quite readily with moisture and therefore the reaction must be performed under strictly anhydrous conditions. Since there is sufficient moisture in ordinary humid air to materially lower the yield of tetraalkylpyrophosphite, the reaction should be performed in an atmosphere of a dry gas. In fact an anhydrous atmosphere should not only be maintained in the reaction vessel but all filtrations should be done in the absence of atmospheric moisture and all vacuums should be broken by the introduction of a dry gas rather than room air. For the above purpose an atmosphere of anhydrous nitrogen has been found to be highly satisfactory although an atmosphere of dried air, anhydrous carbon dioxide or helium also gives satisfactory results.

The new reaction of this invention may be performed over a relatively large range of temperatures, for instance from the freezing point of the solvent up to about 100° C. Although the results obtained at room temperature are satisfactory, temperatures in the range of about minus 10° C. to plus 20° C. are preferred because somewhat higher yields and smaller quantities of by-products are obtained at low temperatures. The reaction is substantially complete in only a few minutes even at very low temperatures and a reaction period of from ten to thirty minutes is all that need be allowed; however, longer reaction periods, for instance two to three hours, may be employed if desired.

When the reaction is substantially complete, the reaction mixture should be rapidly distilled at reduced pressure to remove the tetraalkylpyrophosphite from high boiling by-products because these by-products tend to catalyze the decomposition of the tetraalkylpyrophosphites upon prolonged contact. It is usually advantageous to remove the precipitate of amine salt by filtration or centrifugation before this distillation since such amine salts tend to pass over into the distillate to some extent if they are present in the distilland in high concentrations. Following this crude recovery, the tetraalkylpyrophosphite can be, if desired, further purified by careful fractional distillation under reduced pressure.

The invention will be more fully illustrated by the following examples in which all parts are by weight unless otherwise indicated:

*Example I*

A solution of 138.1 parts by weight of diethylphosphite and 101 parts by weight of triethylamine in 200 parts by volume of benzene is cooled to 0° C., and to this solution there is rapidly added with stirring a precooled solution of 223 parts by weight of diethylchlorophosphite (approximately 70% pure as determined by chlorine analysis) dissolved in 200 cc. of benzene. The resulting mixture is maintained at 0° C. for approximately fifteen minutes and then filtered in an atmosphere of nitrogen to remove triethylamine hydrochloride. The triethylamine hydrochloride precipitate is washed with approximately 200 cc. of benzene which is added to the filtrate and this solution is then rapidly distilled under vacuum to remove the benzene solvent. Other low boiling materials are then removed from the residue by distillation at 15 mm. pressure on a steam bath. The residue remaining from the second distillation is rapidly distilled on a steam bath at 0.1 mm. pressure and the fraction obtained between 55° C. and 80° C. is collected. This crude tetraethylpyrophosphite is further purified by fractional distillation at 0.1 mm. pressure. A 75° C. to 80° C. fraction at this pressure gives a relatively pure product.

The procedure of this example results in yields of approximately 60% of theoretical as compared to yields of approximately 20% obtained by prior art methods.

*Example II*

Example I is repeated except that the reaction is performed at room temperature and distillation of the product is at 11 mm. pressure. The yield is considerably reduced, indicating that lower reaction and distillation temperatures are preferred.

*Example III*

Example II is repeated except that an ether solvent is employed and the reaction mixture is refluxed for one hour. A somewhat lower yield of tetraethylpyrophosphite is obtained.

Tetrapropylpyrophosphite and tetrabutylpyrophosphite are prepared by the procedure of the above examples except that in the first instance dipropylchlorophosphite and dipropylphosphite are substituted for the diethylchlorophosphite and the diethylphosphite respectively of the above examples, and in the second instance dibutylchlorophosphite and dibutylphosphite are substituted for the diethylchlorophosphite and diethylphosphite. Tetrapropylpyrophosphite has a boiling point at 6 mm. pressure of about 147° C. to 149° C. and tetrabutylpyrophosphite has a boiling point at 7 mm. pressure of about 175° C. to 177° C.

We claim:

1. The method of preparing tetraalkylpyrophosphites which comprises reacting, under anhydrous conditions and in the presence of a basic tertiary amine, a dialkylhalophosphite in which the alkyl groups contain from 2 to 4 carbon atoms, with a dialkylphosphite in which the alkyl groups contain from 2 to 4 carbon atoms, and recovering the tetraalkylpyrophosphite.

2. The method of claim 1 wherein the reaction is conducted at a temperature of from about minus 10° C. to plus 20° C.

3. The method of claim 1 wherein the process is conducted in an atmosphere of anhydrous nitrogen.

4. The method of claim 1 wherein said dialkylhalophosphite is a dialkylchlorophosphite.

5. A method of preparing tetraethylpyrophosphite which comprises reacting, under anhydrous conditions and in the presence of a basic tertiary amine, diethylchlorophosphite with diethylphosphite, removing the precipitate of amine salt and recovering the tetraethylpyrophosphite.

6. The method of claim 5 wherein said reaction is conducted at a temperature of from minus 10° C. to plus 20° C.

7. The method of claim 6 wherein said process is conducted in an atmosphere of anhydrous nitrogen.

RICHARD W. YOUNG.
JACK BLODINGER.
ALICE D. WELCHER.

References Cited in the file of this patent

UNITED STATES PATENTS

| Number | Name | Date |
|---|---|---|
| 2,479,939 | Kosolapoff | Aug. 23, 1949 |
| 2,504,165 | Toy II | Apr. 18, 1950 |

OTHER REFERENCES

Toy, I., J. Am. Chem. Soc., vol. 70, pages 3882 to 3886 (1948).